United States Patent [19]

Warner

[11] 4,227,209

[45] Oct. 7, 1980

[54] SENSORY AID FOR VISUALLY HANDICAPPED PEOPLE

[75] Inventor: David A. Warner, Cambridge, Mass.

[73] Assignee: The Charles Stark Draper Laboratory, Inc., Cambridge, Mass.

[21] Appl. No.: 932,271

[22] Filed: Aug. 9, 1978

[51] Int. Cl.² .................................................. H04N 7/00

[52] U.S. Cl. .......................................... 358/94; 358/83

[58] Field of Search .................... 358/83, 94, 212, 213, 358/240, 241, 180

[56] References Cited

U.S. PATENT DOCUMENTS

| | | | |
|---|---|---|---|
| 2,866,182 | 12/1958 | Mash | 358/241 |
| 2,909,668 | 10/1959 | Thurlby et al. | 358/212 |
| 3,243,508 | 3/1966 | Sclar | 358/83 |
| 3,562,408 | 2/1971 | Collins et al. | 358/94 |
| 3,566,130 | 2/1971 | Woburn | 250/213 |
| 3,699,346 | 10/1972 | Harwood et al. | 250/213 |
| 3,766,311 | 10/1973 | Boll | 358/241 |
| 3,883,778 | 5/1975 | Kaji et al. | 358/240 |
| 3,971,931 | 7/1976 | Jehle | 250/213 |

OTHER PUBLICATIONS

"A Portable CCTV Aid for the Partially Blind," *Amer. J. Optom. & Arch. Amer. Acad. Optom.*, vol. 49, No. 2, pp. 178–179 Feb. 1972.

*Primary Examiner*—Richard Murray
*Attorney, Agent, or Firm*—Kenway & Jenney

[57] ABSTRACT

A sensory aid system for visually handicapped persons. The system provides a magnified image of graphical material, such as text. The system includes an image sensor which may include a lens assembly and photodiode detector array. The image sensor is coupled to a display array, with each detector array element having a one-to-one correspondence with one (or a group of) display array elements. The display array may be adjusted electronically to provide any degree of magnification simply by changing the number of elements in the array driven by the signal information. The display array elements may be red light emitting diodes (LED's). In this form, the present invention provides a magnified brightly illuminated red image of the black areas of print against a black, or dark, background, instead of the conventional text format of black print (information) on white paper (noise).

24 Claims, 3 Drawing Figures

SENSORY AID FOR VISUALLY HANDICAPPED PEOPLE

BACKGROUND OF THE INVENTION

The invention relates generally to aids for visually handicapped people and in particular to electro-optical aids for such people who wish to see graphical material.

Many people with low vision problems (such as may be due to diabetic retinopathy, or from lack of blood circulation in the foveal or extrafoveal regions of the retina; or from glaucoma, etc.) may be capable of reading only text with large print. Such text generally must be specially made and typeset. Even with such text, many persons are unable to read although they are not totally blind, i.e. they are able in the coarsest sense to detect light and darkness by the use of the eye. Such visually handicapped people have used various devices and aids to help them see graphical material in a way that allows them to distinguish the information shown. For example, a magnifying glass is one of the oldest but most usual aids for reading printed text.

It has been discovered that the usual arrangement of text, namely black characters on a white page, is undesirable for certain classes of visually handicapped persons. From an optical point of view, the white background presents a high noise background for the information material. Magnification of black material on a white background with a magnifying glass or other similar passive optical systems, does not eliminate this problem.

In the particular case of persons suffering from diabetic retinopathy and extensive bleeding of the retina, blood typically enters the vitreous humor of the eye and stays for extended periods of time. This suspended blood acts as a source of light scattering and the subject in effect must peer through a reddish tinted fog. Under conventional illumination with conventional print, namely, black ink on white paper, the white background provides a large source of non-information carrying light, i.e. noise, which enters the eye and scatters off the blood platelets held in suspension. As a result, in addition to the already partially non-functional retina, the presence of scattered light reduces the modulation (or contrast) transfer function of the eye and makes even highly magnified reading material difficult to resolve.

Accordingly, it is an object of this invention to provide a magnification system that produces a large area for a visually handicapped person to view, the large area presenting some magnification of graphical material.

It is a further object of the invention to translate the graphical material into a form characterized by a relatively high signal-to-noise, or signal-to-clutter, ratio for a visually handicapped person.

It is still a further object of the invention to provide a magnification system that is easy to produce with devices currently well known to the art, and that is furthermore easy for a visually handicapped person to use.

SUMMARY OF THE INVENTION

The invention provides a system for magnifying and displaying graphical material for visually handicapped persons. The system includes an image sensor having a plurality of detector networks, each for converting a portion of an image of the graphical material into an electric signal representative of a mosaic-type picture element for the image. The system further includes a display comprising a light emitting diode (LED) array. The elements of the LED array are selectively connected to the detector networks so that the light emitting diode array can display a selectively magnified image of the graphical material. Although in some forms of the invention, ambient illumination may be sufficient, an external light source (such as a tungsten lamp) may be used to illuminate the image-to-be-displayed for the image sensor.

In preferred embodiments, the light emitting diode array displays a bright red image against a black or dark background, thereby providing a relatively high signal-to-noise (or clutter) ratio. In alternative embodiments, display array sources of other types and colors may use the principles disclosed here depending on the pathology or requirements of the user. By way of example, liquid crystal display (LCD) elements may be utilized for the output display, with ambient or additional illumination and desired color filters, as necessary. The LCD approach provides a power savings relative to LED displays. In still other alternative embodiments, plasma displays may be used in keeping with the invention.

The method of providing a magnified, easy-to-read image of graphical material for visually handicapped people comprises the step of converting the image to electric picture element signals by means of an image sensor. Each picture element signal is representative of the intensity of light reflected from a portion of the graphic material. The method further includes the step of converting the picture element signals to signals suitable to drive a light emitting diode array, and using the signals so converted to drive a light emitting diode array so that the light emitting diode array displays a magnified image of the graphical material wherein the portions of the graphic material characterized by relatively low reflectivity are represented in the display array by illuminated LED's and the portions characterized by relatively high reflectivity are represented in the display array by non-illuminated LED's.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
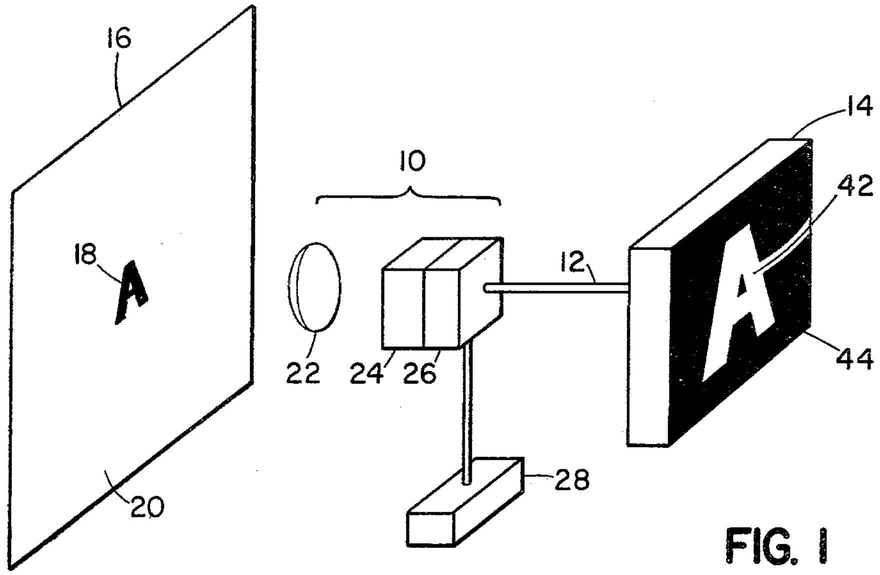
FIG. 1 illustrates, partially in block diagram form, an exemplary system embodying the invention.

FIG. 1 shows an image sensor 10, coupled by cable 12 to a display 14. The display 14 comprises a two-dimensional array of light emitting diodes (LED's). In other embodiments, alternative light emitting devices may be used, such as incandescent bulbs or plasma display arrays, or liquid crystal displays. In the present embodiment, the image sensor and display are separate units coupled by a cable. However, in alternative embodiments, the image sensor and display may form an integral unit. It will be understood that suitable power supplies are provided, either internally or by external connection, for each element in the invention. Also shown in FIG. 1 is a sheet of graphical material 16. The sheet has a conventional printing format, namely, black printing 18 on a white background 20.

The image sensor 10 includes an objective lens 22 and an associated photodiode array 24 arranged so that each element of the array 24 provides an electrical signal representative of a picture element (or "pixel") of the image viewed by lens 22. Any suitable image sensor that converts an optical image to pixel signals could be suitably substituted for the lens and photodiode array, including such adaptations of a Vidicon. The photodiode array 24 and lens 22 may be mounted in a housing which is small enough and compact enough to be held by a hand or some small suitable support so that cursor-type scanning of the sheet of graphical material 16 can be done by hand.

Figure 2:
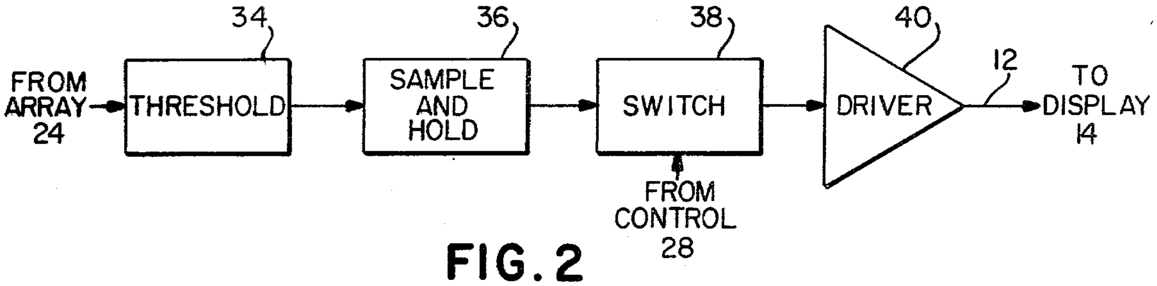
FIG. 2 shows in block diagram form a detector network for the system of FIG. 1.

The image sensor 10 also includes a detector network 26 which is connected to the output of photodiode array 24, and an operator control 26 which is connected to network 26. In the present embodiment, network 26 includes an array of circuits, each being associated with one of the photodiodes in array 24. One circuit of network 26 is illustrated in block diagram form in FIG. 2. That circuit includes a go/no go threshold circuit 34 (such as a Schmitt trigger) coupled to the associated photodiode, a sample and hold (S/H) circuit 36, and switch network 38 and display driver 40. The output of display driver 40 is coupled to display 14 by way of cable 12. In some forms of the invention, the circuit 34 may be characterized by an adjustable threshold which may be varied to accommodate non-white regions in graphic material, for example.

With this configuration, in operation, the image is focused by lens 22 on the array 24. The optical signal representing the portions of the image incident on the respective elements of array 24 are detected on a binary basis at each of the detector circuits 20. The resultant 1 or 0 (depending on photodiode output signal relative to a predetermined threshold) is then sampled and held, before being applied for the "hold" period to one or more associated elements of the LED array in display 14.

LED array 14 has light emitting diodes which are bright red when luminescent (corresponding to a binary 1 pixel signal). The background provided by the non-illuminated LED's is otherwise dark (corresponding to a binary 0 pixel signal). In effect, then, the black printed character 18 on the white sheet of graphical material 16 is translated into a red character 42 on a black background 44. As noted previously, the "red character on a black background" format in display 14 is important for people with certain low vision problems. Of course, color displays may be utilizied depending on the pathology or other user requirements.

In the present embodiment, each element in display 14 may be a stack of LED's which are connected to be driven simultaneously. The number of stack of LED's (i.e. elements) in display 14 is a multiple, such as four, times the number of photodiodes and detector networks in sensor 10. With this configuration, the operator control 28 may be selectively operated by the user to provide one-to-one image-to-display relationship or four-to-one magnified image-to-display relationship. FIG. 1 illustrates operation in the four-to-one mode.

When in the one-to-one mode, control 28 controls each of the switch networks 28 so that the output of its respective sample and hold network 36 is coupled (by switch 38 and driver 40) to a single LED in display 14. As a result, each pixel signal is directed to one LED on a one-to-one basis. The array of coupled LED's in this mode is only one fourth utilized.

When in the four-to-one magnification mode, control 28 controls each of the switch networks 28 so that the output of its respective sample and hold network 36 is coupled (by switch 38 and driver 40) to a group of four adjacent LED's in display 14. As a result, each pixel signal is directed to a four element sub-array of LED stacks, thereby utilizing the entire array of display 14.

Both the one-to-one and four-to-one modes of operation may provide magnification depending on the relative spacing of the LED's compared to the relative spacing of the photodiodes in array 24, and also depending on optical properties of lens 22.

In alternative embodiments, different ratios and relative spacings of the photodiodes and LED's may readily be used to achieve desired magnification options for the user. In addition, a further lens assembly may be used between the user and display 14 to provide alternative or substitute magnification control.

Figure 3:
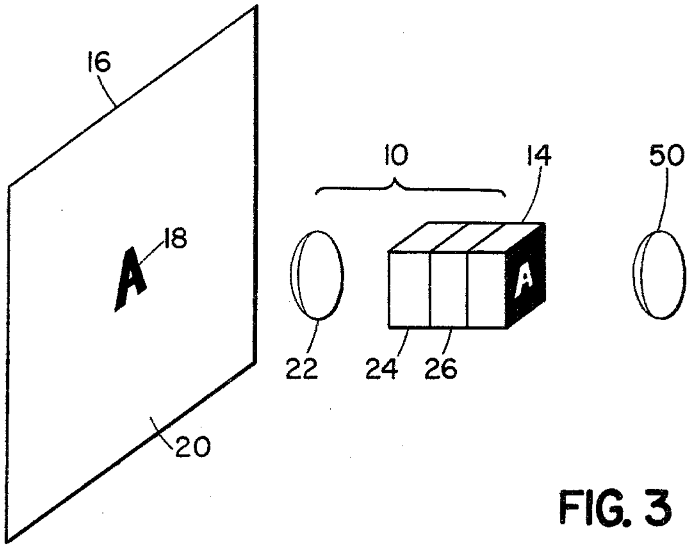
FIG. 3 illustrates partially in block diagram form, another exemplary system embodying the invention.

The latter form of the invention is illustrated in FIG. 3. In that figure, elements having corresponding elements in the FIG. 1 embodiment are denoted with the same reference designations. In FIG. 3, the image sensor 10 and display array 14 are shown as an integral unit. The magnification control for this embodiment is provided by the lens 50 which may be interchanged within a suitable housing to provide selective control of the image seen by the user. Now, instead of black print (information) on white paper (noise), there is provided a magnified brightly illuminated red LED array image of the black area of the print against a black background. What has happened is that the noise level of the system has been reduced several orders of magnitude while at the same time the signal source (namely, bright LED versus tungsten-lit black ink, for example) has been increased. Hence, the signal-to-noise, or clutter, ratio of the system has been greatly enhanced.

In the simple forms shown here, the invention deals only with two grey levels, namely, full on or full off, or stated another way, black or white. In alternative forms of the invention, intermediate grey levels, such as four or eight, could also be used, depending upon cost and resolution restrictions on the system. This latter approach would allow some interpretation of more complex materials, such as photographs.

Furthermore, the present invention is not limited to hand-controlled cursor-type scanning by the user. In alternative forms, a large photodiode array and associated display could be used to display a single sheet of graphic material 16 at a time. The basic choice is whether it is more practical to scan the image on one hand, versus using a single large array detector 24 (which may be expensive) on the other hand.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A sensory aid system for visually handicapped persons, comprising:

an image sensor including a lens assembly adapted to focus a graphic image on a plurality of detector networks, each detector network including means for converting a portion of a graphic image into an electrical signal representative of a picture element of that image, and display means including an array of display elements wherein at least one of said display elements is coupled to a corresponding one of said detector networks wherein said image sensor further comprises a control means, said control means being operable to couple each of said drive signals to groups of one or more adjacent elements in said detector array wherein the number of display elements in said groups is selectable.

2. A system according to claim 1 wherein said image sensor comprises an array of photodiodes, each element of said photodiode array being a portion of one of said detector networks and being responsive to light from the associated portion of said graphic image, each of said detector networks further including means to generate a picture element signal representative of the intensity of said light from said portion and means to periodically sample and hold said picture element signal to generate a signal for driving at least one corresponding element of said display array.

3. A system according to claim 1 wherein said picture element signal generating means provides signals representative of one of n levels of intensity.

4. A system according to claim 3 where n=2.

5. A system according to claim 1 wherein said picture element signal generating means provides signals representative of one of n levels of intensity.

6. A system according to claim 5 where n=2.

7. A system according to claim 1 wherein said display elements are light emitting diodes (LED's) and said drive signal generator is adapted so that portions of said image characterized by relatively low reflectivity are represented in said display array by illuminated LED's and portions of said image characterized by relatively high reflectivity are represented in said display array by non-illuminated LED's.

8. A system according to claim 8 wherein said picture element signal generating means provides signals representative of one of n levels of intensity.

9. A system according to claim 8 where n=2.

10. System according to claim 7 wherein said display means further comprises an output lens adapted for magnification of the image formed by said display array.

11. System according to claim 1 wherein said display means further comprises an output lens adapted for magnification of the image formed by said display array.

12. System according to claim 1 wherein said display means further comprises an output lens adapted for magnification of the image formed by said display array.

13. System according to claim 1 wherein said detector networks are adapted so that portions of said image characterized by relatively low reflectivity are represented in said display by illuminated display elements, and portions of said image characterized by high reflectivity are represented in said display by non-illuminated display elements.

14. System according to claim 13 wherein each of said display elements is one or more light emitting diodes (LED's).

15. System according to claim 1 further comprising a means for illuminating said graphic image.

16. System according to claim 1 wherein said picture element signal generating means provides a signal having a first binary value when said light intensity is below a predetermined threshold and a second binary value when said light intensity is above said predetermined threshold.

17. System according to claim 16 wherein said picture element signal generating means further includes means to adjustably select said predetermined threshold.

18. A method of providing an image of graphical material for visually handicapped people comprising:

converting the image to electric picture element signals by means of an image sensor, each of said picture element signals being representative of the intensity of light from an associated portion of said image.

19. A method of providing an image of graphical material for visually handicapped people comprising:

converting the image to electric picture element signals by means of an image sensor, each of said picture element signals being representative of the intensity of light from an associated portion of said image, converting said picture element signals to corresponding signals suitable to drive one or more elements of a light emitting diode (LED) array, and coupling said drive signals to said array elements, whereby portions of said image characterized by relatively low reflectivity are represented in said LED array by illuminated LED's and portions of said image characterized by relatively high reflectivity are represented in said LED array by non-illuminated LED's wherein said coupling step includes the sub-step of coupling each of said drive signals to a group of adjacent display elements in said array, wherein the number of elements in said groups is selected.

20. A sensory aid system for visually handicapped persons, comprising:

an image sensor including a lens assembly adapted to focus a graphic image on a plurality of detector networks, each detector network including means for converting a portion of a graphic image into an electrical signal representative of a picture element of that image, and display means including an array of display elements wherein at least one of said display elements is coupled to a corresponding one of said detector networks, wherein said detector networks and adapted so that portions of said image characterized by relatively low reflectivity are represented in said display by illuminated display elements, and portions of said image characterized by high reflectivity are represented in said display by non-illuminated display elements, wherein the light from said illuminated display elements is red.

21. System according to claim 20 wherein each of said display elements is one or more light emitting diodes (LED's).

22. A system according to claim 20 wherein said image sensor further comprises a control means, said control means being operable to couple each of said drive signals to groups of one or more adjacent elements in said detector array wherein the number of display elements in said groups is selectable.

23. A system according to claim 22 wherein said picture element signal generating means provides signals representative of one of n levels of intensity.

24. A system according to claim 23 where n=2.

* * * * *